United States Patent
Brookes et al.

(10) Patent No.: US 9,377,538 B2
(45) Date of Patent: Jun. 28, 2016

(54) PHOTOMULTIPLIER APPARATUS AND RADIATION DETECTOR INCORPORATING SUCH APPARATUS

(71) Applicant: JOHNSON MATTHEY PUBLIC LIMITED COMPANY, London (GB)

(72) Inventors: Stephen John Brookes, Durham (GB); Colin Cunningham, Cleveland (GB)

(73) Assignee: JOHNSON MATTHEY PUBLIC LIMITED COMPANY, London (GB)

( * ) Notice: Subject to any disclaimer, the term of this patent is extended or adjusted under 35 U.S.C. 154(b) by 0 days.

(21) Appl. No.: 14/429,821

(22) PCT Filed: Sep. 20, 2013

(86) PCT No.: PCT/GB2013/052476
§ 371 (c)(1),
(2) Date: Mar. 20, 2015

(87) PCT Pub. No.: WO2014/045058
PCT Pub. Date: Mar. 27, 2014

(65) Prior Publication Data
US 2015/0234057 A1 Aug. 20, 2015

Related U.S. Application Data

(60) Provisional application No. 61/703,805, filed on Sep. 21, 2012.

(30) Foreign Application Priority Data

Sep. 21, 2012 (GB) .................................... 1216850.6

(51) Int. Cl.
*G01T 1/20* (2006.01)
*G01T 1/208* (2006.01)
(Continued)

(52) U.S. Cl.
CPC ................ *G01T 1/2002* (2013.01); *G01J 1/20* (2013.01); *G01T 1/208* (2013.01); *H01J 9/26* (2013.01); *H01J 43/28* (2013.01)

(58) Field of Classification Search
CPC .......................................................... G01T 1/20
USPC ................................................... 250/368, 367
See application file for complete search history.

(56) References Cited

U.S. PATENT DOCUMENTS

| | | | |
|---|---|---|---|
| 5,548,116 A | 8/1996 | Pandelisev | |
| 5,869,836 A * | 2/1999 | Linden | G01V 5/04 250/256 |

(Continued)

FOREIGN PATENT DOCUMENTS

| | | |
|---|---|---|
| EP | 0 129 682 A1 | 1/1985 |
| WO | 95/23983 A1 | 9/1995 |

(Continued)

OTHER PUBLICATIONS

International Search Report, dated Feb. 24, 2014, from corresponding PCT application.

(Continued)

*Primary Examiner* — David Porta
*Assistant Examiner* — Meenakshi Sahu
(74) *Attorney, Agent, or Firm* — Young & Thompson (57) ABSTRACT

A radiation detection apparatus (2) is disclosed. The apparatus includes a housing (20), a window (26) at least partially transparent to electromagnetic radiation in a first wavelength range and a photomultiplier tube (24) for generating an electrical output signal dependent on the intensity of the electromagnetic radiation. A resiliently deformable optical coupling (28) is located between the window and the photomultiplier tube for allowing at least some electromagnetic radiation passing through the window to enter the photomultiplier tube, and a scintillator element 8 converts gamma radiation into visible light in the first wavelength range entering the photomultiplier tube.

20 Claims, 5 Drawing Sheets (51) Int. Cl.
*H01J 43/28* (2006.01)
*H01J 9/26* (2006.01)
*G01J 1/20* (2006.01)

(56) References Cited

U.S. PATENT DOCUMENTS

| | | | |
|---|---|---|---|
| 6,355,932 B1 | 3/2002 | Frederick | |
| 6,465,788 B1* | 10/2002 | Medley | E21C 35/22 250/368 |
| 2002/0056809 A1 | 5/2002 | Frederick et al. | |
| 2004/0119008 A1* | 6/2004 | Williams | G01V 5/08 250/256 |
| 2006/0192126 A1 | 8/2006 | Medley et al. | |
| 2010/0090111 A1 | 4/2010 | Stoller et al. | |
| 2011/0095173 A1 | 4/2011 | Menge et al. | |

FOREIGN PATENT DOCUMENTS

| | | |
|---|---|---|
| WO | 97/42523 A1 | 11/1997 |
| WO | 02/09143 A2 | 1/2002 |

OTHER PUBLICATIONS

GB Search Report, dated Mar. 12, 2014, from corresponding GB application.

* cited by examiner

PHOTOMULTIPLIER APPARATUS AND RADIATION DETECTOR INCORPORATING SUCH APPARATUS

The present invention relates to a photomultiplier apparatus and to a radiation detector incorporating such apparatus, and relates particularly, but not exclusively, to a photomultiplier apparatus for use in a gamma radiation detector.

A gamma detector for use in mining applications is disclosed in US2002/0056809. The gamma detector has a scintillation element for converting gamma radiation into visible light, and a photomultiplier tube for converting visible light from the scintillation element into an electrical output signal. The scintillation element is mounted within a shield and emits visible light through an optical coupler, a window positioned at an end of the shield, through a further optical coupler and through a face of the photomultiplier tube (PMT).

This arrangement suffers from the disadvantage that it is difficult to make the gamma detector intrinsically safe for use in environments containing flammable gases, while at the same time enabling different scintillation elements to be used. Intrinsic safety is defined in British Standard BS EN 60079-11:2012.

Preferred embodiments of the present invention seek to overcome the above disadvantage of the prior art.

According to the present invention, there is provided a photomultiplier apparatus comprising:
a. a first housing;
b. window means mounted to the first housing, the window means being at least partially transparent to electromagnetic radiation of a first wavelength range;
c. photomultiplier means provided in the first housing for receiving electromagnetic radiation of said first wavelength range passing through said window means and generating an electrical output signal dependent on the intensity of said electromagnetic radiation;
d. sealing means for isolating electrical terminals of said photomultiplier means from said window means; and
e. resiliently deformable optical coupling means located between said window means and said photomultiplier means, for allowing at least some electromagnetic radiation of said first wavelength range passing through said window means to enter said photomultiplier means, wherein said resiliently deformable optical coupling means encapsulates an end of the photomultiplier means facing said window means.

The photomultiplier means preferably comprises a photomultiplier tube. Photomultiplier tubes comprise electronic components for generating an electrical signal in proportion to light entering the PMT which are enclosed in a space surrounded by one or more sidewalls, an end cap typically including electrical terminals and an opposed end-face, typically made of glass, for example a borosilicate glass. The end face is the means by which light, e.g. from a scintillation element, enters the PMT so that the PMT can generate a current dependent on the amount of light entering through the end face. The end face is typically fragile and, if the end face is breached, the electrical components inside the PMT become exposed to the atmosphere. When the photomultiplier apparatus is intended for use in a hazardous atmosphere, where flammable gases are, or may be, present, the exposure of the electrical components of the PMT to such an atmosphere can cause an explosion. When the PMT is housed together with the scintillator within a housing, the PMT may be protected by various shock absorbing arrangements which are shown in the prior art. If, however, it is desired to provide the PMT in a separate housing, so that it may be coupled to different scintillators, it is important that the PMT is also protected in the absence of the scintillator. This enables the detector to remain safe for use in hazardous atmospheres even if the scintillator is removed from the detector or if the scintillator is broken. By providing resiliently deformable optical coupling means located between said window means and encapsulating an end of said photomultiplier means, we provide the advantage of preventing access to high voltage parts of the photomultiplier means in the event of damage to the window means, thereby enabling the photomultiplier apparatus to be made intrinsically safe for use in environments containing flammable gases. In addition, by providing window means mounted to the housing, this enables a self-contained photomultiplier apparatus to be provided, which can be used with a variety of different interchangeable scintillation units to form a radiation detector.

The photomultiplier apparatus is preferably suitable for use in a hazardous location, where potentially explosive gas mixtures may be present continuously or intermittently at some time during operation of the apparatus. The photomultiplier apparatus is therefore preferably designed to be an intrinsically safe electrical device, as defined by the appropriate standards including the current version of European Standard EN 60079:2009, especially parts 0, 10 and 11 thereof. Intrinsically safe has the meaning given in the standards. Intrinsically safe is a widely used term having a precise meaning that is understood by the skilled person. According to European Standard EN 60079:2009 and British Standard BS EN 60079-11:2012, intrinsic safety is a type of protection based on the restriction of electrical energy within equipment and of interconnecting wiring exposed to the explosive atmosphere to a level below that which can cause ignition by either sparking or heating effects. An intrinsically safe circuit is a circuit in which any spark or any thermal effect produced in the conditions specified in the standard, which include normal operation and specified fault conditions, is not capable of causing ignition of a given explosive atmosphere. An intrinsically safe electrical device is a device in which all of the electrical circuits are intrinsically safe circuits. The design and selection of components and the test criteria applied to such equipment is governed by national and international standards such as BS EN 60079-11:2012 and its related parts, including part 0 concerning general requirements for electrical equipment intended for use in explosive atmospheres. Preferably the photomultiplier apparatus conforms at least to Level of Protection ib of the standard, i.e. it is designed to be safe in use in explosive atmospheres in normal operation and with the application of those non-countable faults which give the most onerous condition; and in normal operation and with the application of one countable fault plus the application of those non-countable faults which give the most onerous condition as defined in section 5.3 of BS EN 60079-11:2012. Countable faults and non-countable faults are defined in BS EN 60079-11:2012 at paragraph 3.7. Most preferably, the photomultiplier apparatus conforms to Level of Protection is of the standard, i.e. it is designed to be safe in use in explosive atmospheres when the circuit contains two countable faults as defined in section 5.2 of BS EN 60079-11:2012. Such protection is achieved by the use of components and construction methods which include, for example, the separation of parts of the circuits by minimum separation distances as set out in section 6.3 "Separation Distances" of BS EN 60079-11:2012.

Preferably, voltage transformer means is provided in said first housing for converting electrical power having a first mean voltage to electrical power having a second mean voltage, higher than said first mean voltage. Preferably connector means is provided for connecting said voltage transformer means to a power supply external to said first housing. Preferably said sealing means isolates components having said second mean voltage in said first housing from the exterior of said first housing. By providing voltage transformer means in the first housing for converting electrical power having a first mean voltage to electrical power having a second mean voltage, higher than the first mean voltage, connector means for connecting the voltage transformer means to a power supply external to the first housing, and sealing means for isolating components having the second mean voltage in the first housing from the exterior of the first housing, this provides the advantage of enabling the photomultiplier apparatus to be made intrinsically safe for use in flammable environments by isolating the high voltage supply terminals of the photomultiplier means from the exterior of the first housing. The voltage transforming means may comprise at least one voltage multiplier. At least one said voltage multiplier may comprise a Cockcroft-Walton voltage multiplier. The apparatus may further comprise voltage regulator means for receiving electrical power from said connector means and supplying electrical power having said first mean voltage to said voltage transforming means. The apparatus may further comprise adjustment means for adjusting said second average voltage.

The apparatus may further comprise signal processing means for processing an output signal from said photomultiplier means, and at least one capacitor for isolating terminals of said voltage transforming means having said second mean voltage from said signal processing means.

This provides the advantage of enabling high voltage power supply terminals of the photomultiplier means to be isolated from signal processing means communicating with the exterior of the first housing, thereby enabling the apparatus to be made intrinsically safe.

The optical coupling means encapsulates an end of the photomultiplier means facing said window means. This provides the advantage of making the photomultiplier apparatus more robust by providing a shock absorber between the window means and the photomultiplier means and also provides a physical barrier between the internal space of the PMT and the atmosphere in the event that the window is broken. The optical coupling means adheres to the end face of the PMT. The thickness of the optical coupling means covering the end-face of the photomultiplier means is preferably greater than 1 mm and more preferably at least 2 mm. The optical coupling means extends beyond the location of any join between the end face of the PMT and any other part of the PMT, for example the join between the end face and the side wall(s) of the PMT. Preferably the optical coupling means extends along a portion of the sidewall(s) of the PMT, most preferably along at least 10% of the length of the sidewalls in the direction of the longitudinal axis of the PMT. Preferably the optical coupling means adheres to the sidewalls of the PMT.

The optical coupling means preferably comprises at least one mouldable material, more preferably a resilient soft, polymeric material. The optical coupling means allows at least some electromagnetic radiation of said first wavelength range passing through said window means to enter said photomultiplier means. Preferably the optical coupling means is transparent to radiation emitted by a scintillation element coupled to the photomultiplier apparatus. Suitable materials for the optical coupling means include silicone elastomers and other polymers such as ethylene-vinyl acetate (eva) copolymers. Suitable silicone elastomers are already known for providing resilient lenses and optical coupling disks and a range of such materials is readily available commercially, for example from Momentive Performance Materials or Dow Corning.

The photomultiplier apparatus of the invention includes sealing means for isolating electrical terminals of the photomultiplier means from the window means. The sealing means may form a gas-tight barrier to prevent contact between the surrounding atmosphere and said electrical terminals in the event that the window is broken.

The sealing means may comprise one or more gaskets or O-rings to provide a gas-tight seal between the PMT and the housing. Preferably, however, the sealing means comprises an electrically insulating material which encapsulates at least some of the electrical terminals of the photomultiplier apparatus. The electrically insulating material may, at least partly, encapsulate the photomultiplier means. Preferably, when the optical coupling means extends along a part of the sidewall of the photomultiplier means, the electrically insulating material overlaps the optical coupling means, at least partially, so that the photomultiplier means is completely encapsulated by the sealing means and the optical coupling means. The sealing means may be adapted to resist transmission of electromagnetic radiation in at least part of said first wavelength range. Preferably the sealing means is substantially opaque to said first wavelength range. This provides the advantage of minimising the amount of radiation of the first wavelength range reaching the photomultiplier means other than through the window means, which in turn improves the signal to noise ratio of the apparatus.

The sealing means may comprise at least one mouldable material. At least one said mouldable material may comprise a silicone material. The sealing means in the form of an encapsulating electrically insulating material may be formed from similar materials to the optical coupling means with the inclusion of opacifiers such as dyes, pigments or fillers.

The first housing normally includes a first material having smaller transmissability to electromagnetic radiation of said first wavelength range than said window means, and is preferably opaque to said radiation. The first material may comprise at least one metal or plastics material. Suitable metals include non-oxidising metals such as stainless steel. Suitable plastics include materials which dissipate static electricity and so are relatively unlikely to generate a spark at their surface. Such materials are specified in the standards, such as British Standard BS EN 60079-11:2012, for intrinsically safe electrical apparatus.

According to another aspect of the present invention, there is provided a radiation detection apparatus comprising:

a photomultiplier apparatus according to the invention and scintillator means for converting ionising radiation into electromagnetic radiation of said first wavelength range, wherein the scintillator means is optically coupled to the window means of said photomultiplier apparatus.

Ionising radiation which may be detected by the radiation detection apparatus includes electromagnetic radiation such as gamma, beta, alpha particles, neutrons and X-rays. Preferably the radiation detecting apparatus is suitable for detecting gamma radiation, at least.

The scintillator means may comprise a scintillation crystal or an organic scintillator such as a plastic scintillator or a liquid scintillator. Such scintillators are well-known for use in detection of ionising radiation. Scintillation crystals useful in the present apparatus include any of the currently known scintillation crystals including, for example, sodium iodide, zinc sulphide and caesium iodide amongst many others. Plastic scintillators are widely used in radiation detectors and they may be formed into any suitable shape or size. Typical plastic scintillators are in the form of an elongate rod which may have a length from a few mm to greater than 1 m.

The scintillator means may comprise a second housing comprising a second material having greater transmissability than said first material to the ionising radiation. The second housing protects the scintillator means from the atmosphere, but is selected to allow the ionising radiation which is to be detected by the detector to pass through the housing to the scintillator. The scintillator means or the housing may be provided with a reflective coating in order to reduce or prevent loss of light from the scintillator means, other than to the photomultiplier means. The scintillator means or said second housing includes means for mechanically coupling the scintillator means to the first housing such that the scintillator means is optically coupled to the window means of said photomultiplier apparatus. The mechanical coupling means is preferably releasable so that the scintillator means and the photomultiplier means may be coupled together and decoupled. The mechanical coupling means must provide a light-tight seal between the first and second housings so that light is prevented from entering the photomultiplier means, with the exception of light from the scintillator means. Suitable coupling means may include co-operatively threaded portions provided on the second housing and the first housing, a bayonet-type coupling between the first and second housings or an arrangement of fixing points which are coupled by means of screws, bolts or clips. It is a particular benefit of the radiation detector means of the invention that the photomultiplier apparatus is intrinsically safe, even in the absence of the scintillator means, so that loss or breakage of the scintillator means does not compromise the intrinsic safety of the apparatus.

The scintillator means may be optically coupled to the window means of the photomultiplier apparatus by means of a pad or disk of resilient transparent material or by an optical-coupling grease, typically a silicone grease.

According to a further aspect of the present invention, there is provided a method of manufacturing a photomultiplier apparatus, the method comprising the steps of:
 a) forming an assembly comprising optical coupling means located between photomultiplier means and window means, wherein the optical coupling means is resiliently deformable, encapsulates an end of the photomultiplier means facing said window means and the photomultiplier means is adapted to receive electromagnetic radiation of a first wavelength range passing through said window means thereby generating an electrical output signal dependent on the intensity of said electromagnetic radiation;
 b) mounting the assembly within a housing; and
 c) providing sealing means for isolating electrical terminals of the photomultiplier means from the window means.

The step of forming said assembly may comprise locating said photomultiplier means and said window means in position relative to each other and moulding said optical coupling means therebetween. The method may include locating the photomultiplier means and window means relative to each other in a jig. The step of providing the sealing means may comprise at least partially filing the housing with at least one electrically-insulating mouldable material.

The radiation detector apparatus may be used to monitor ambient radiation or may be used to count radiation from a particular source, such as those used in a level gauge. The intrinsically safe design of the radiation detector makes it particularly suitable for use in hazardous areas, where a potentially explosive or flammable atmosphere may be present. The radiation detector may be used in pipelines, for example oil and gas pipelines.

A preferred embodiment of the invention will now be described, by way of example only and not in any limitative sense, with reference to the accompanying drawings, in which.

Referring to FIGS. 1 to 6, a gamma detection apparatus 2 comprises a photomultiplier unit 4 mountable by means of a cable gland inside a pipe (not shown) to be monitored, and a scintillator unit 8. The photomultiplier unit has rugged plastic handle rings 5. The scintillator unit 8 has a nylon housing 10 having strengthening ribs 12, and contains a sodium iodide or caesium iodide crystal 14 for converting gamma radiation into visible light in the wavelength range 300 nm to 700 nm. The crystal 14 is mounted to the housing 10 by means of a foam thrust cushion 16, a conductive O-ring 17 and a scintillator cage 18 made of phosphor bronze or stainless steel.

The photomultiplier unit 4 has a rigid housing 20 of material opaque to visible light, which, in this embodiment is stainless steel and defining an aperture 22 at one end of which an assembly comprising a photomultiplier tube 24, a glass window 26 and a resiliently deformable optical coupling 28, in the form of a silicone casting compound moulded between the photomultiplier tube 24 and glass window 26, is mounted. The other end is closed by an end cap 6 which includes a cable gland. The optical coupling 28 is generally transparent to light in the wavelength range emitted by the crystal 14. The photomultiplier tube 24 converts visible light, passing from the scintillator unit 8 through the glass window 26, into an electrical output signal. The operation of the photomultiplier tube 24 will be familiar to persons skilled in the art and will therefore not be described in further detail herein. The scintillator unit 8 and photomultiplier unit 4 include co-operatively threaded portions 9a and 9b by which means the scintillator unit and photomultiplier unit may be coupled together so as to bring the crystal 14 into contact, preferably via an optical coupler, with the window 26.

Figure 8:
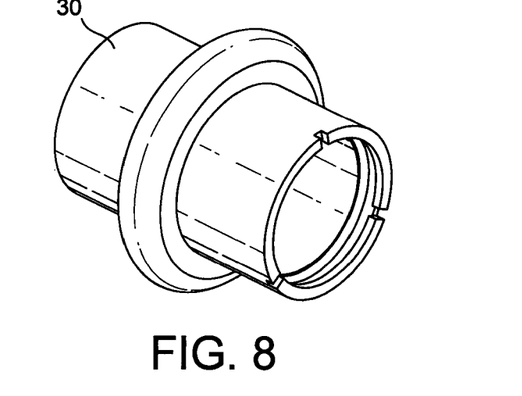
FIG. 8 is a perspective view of a mould support for use in manufacturing the apparatus of FIG. 1.
Figure 9:
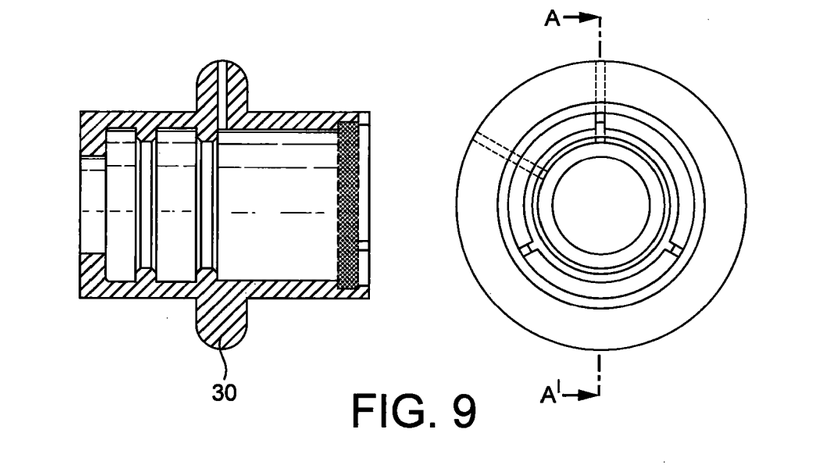
FIG. 9 is a cross sectional side view of the mould support of FIG. 8.
Figure 10:
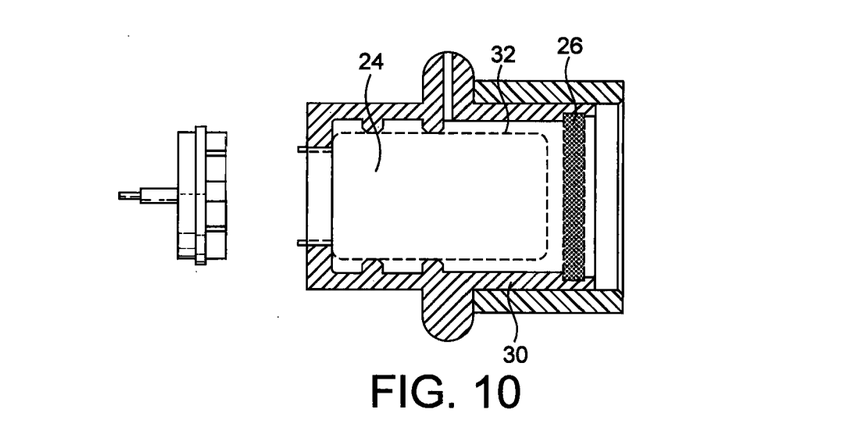
FIG. 10 is a cross sectional side view of the mould support of FIG. 8 with the window and photomultiplier tube in position before moulding of the optical coupler.

Referring to FIGS. 8 to 10, in order to mould the optical coupling 28, the photomultiplier tube 24 and glass window 26 are positioned in a mould 30 such that they are separated from each other, and then mouldable silicone casting material is injected into gap 32 between the photomultiplier tube 24 and window 26 to form the deformable optical coupling 28. The optical coupling 28 when set forms an airtight seal and has a volume resistivity of the order of $1.8 \times 10^{15}$ Ohm.cm in order to ensure that in the event of breaking of the window 26, electrical current is prevented from flowing to high voltage contacts of the photomultiplier tube 24 (described in greater detail below) from the atmosphere outside of the housing 20. The optical coupling 28 when set has sufficient hardness to protect the photomultiplier tube 24 and its associated electronics, for example a shore hardness of 44A. Referring back to FIG. 2, the assembly comprising the photomultiplier tube 24, window 26 and optical coupling 28 is then mounted to the housing 20 so that the window 26 closes aperture 22. Sealing means 56, comprising an opaque silicone moulding compound, may then be filled into said housing partly covering the optical coupling previously formed.

Figure 1:
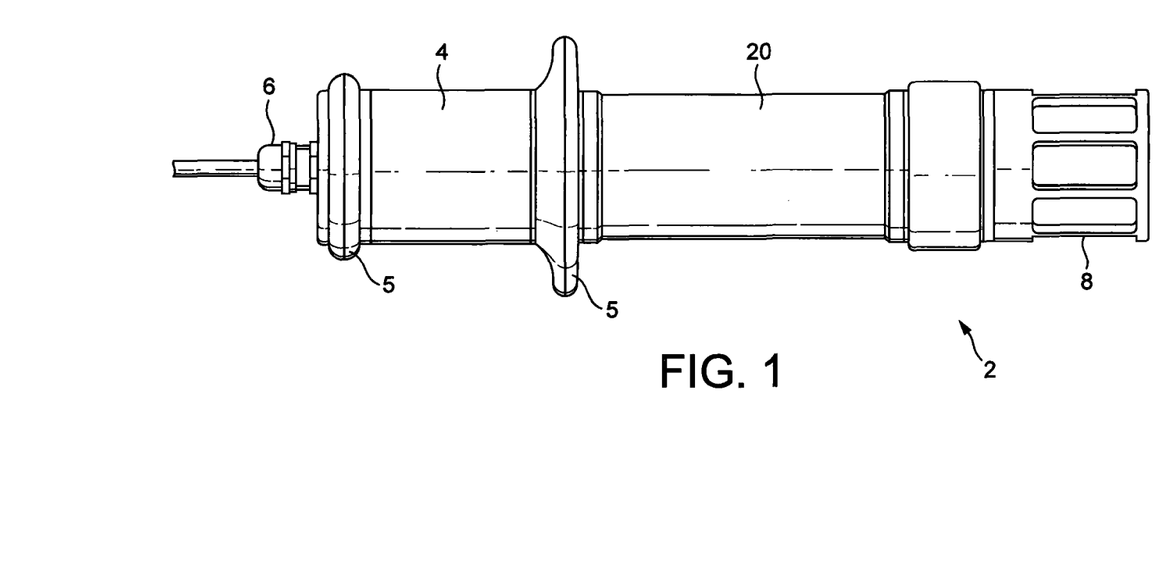
FIG. 1 is a side view of a radiation detection apparatus embodying the present invention.
Figure 2:
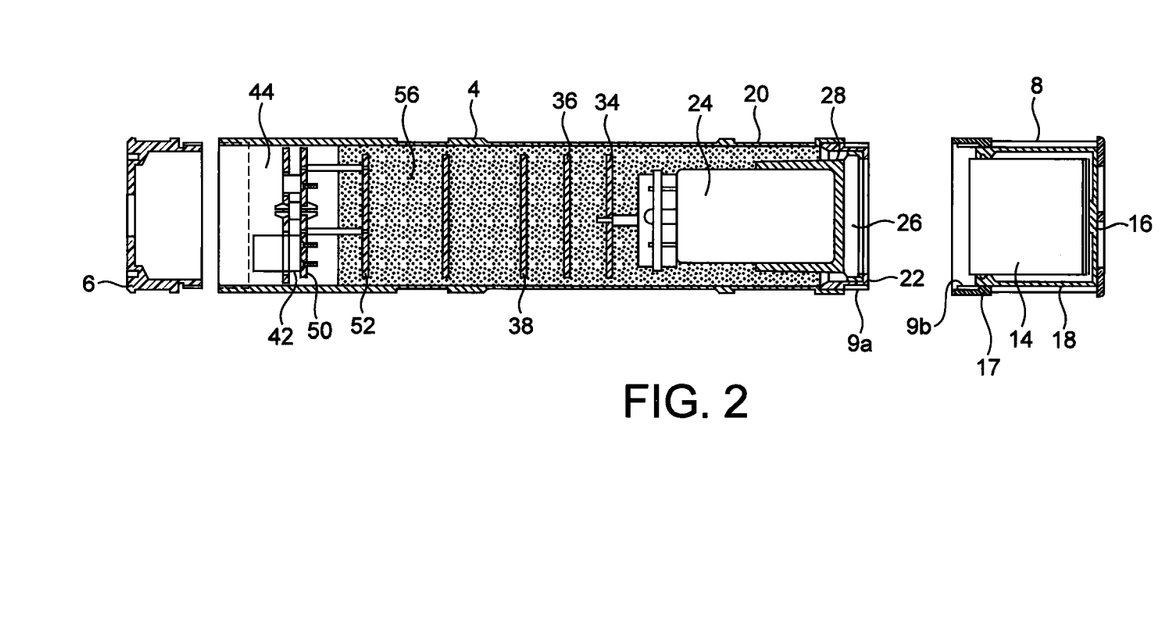
FIG. 2 is an exploded cross-sectional view of the apparatus of FIG. 1.
Figure 3:
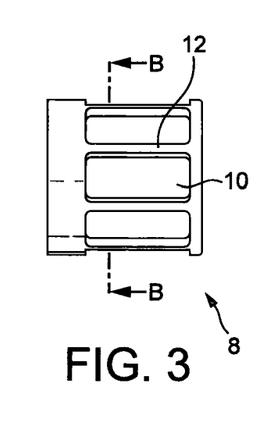
FIG. 3 is a side view of a scintillator housing of the apparatus of FIG. 1.
Figure 4:
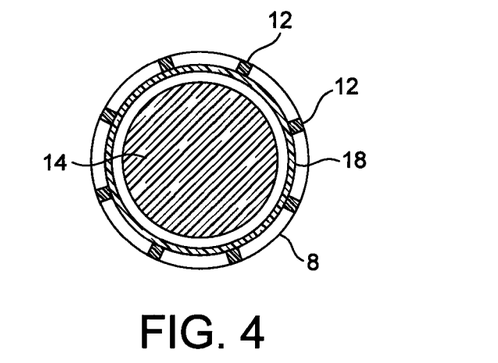
FIG. 4 is a view along the line B-B in FIG. 3.
Figure 5:
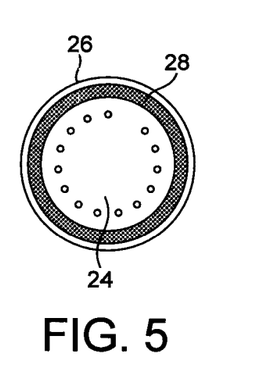
FIG. 5 is an end view of a photomultiplier tube of the apparatus of FIG. 2.
Figure 6:
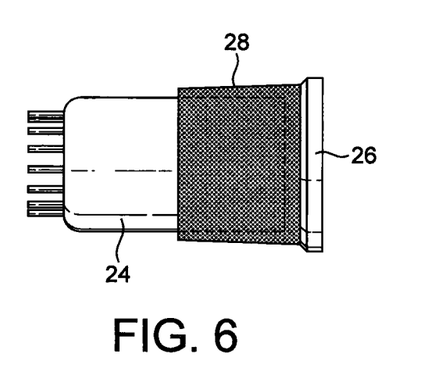
FIG. 6 is a side view of the photomultiplier tube of FIG. 5.
Figure 7:
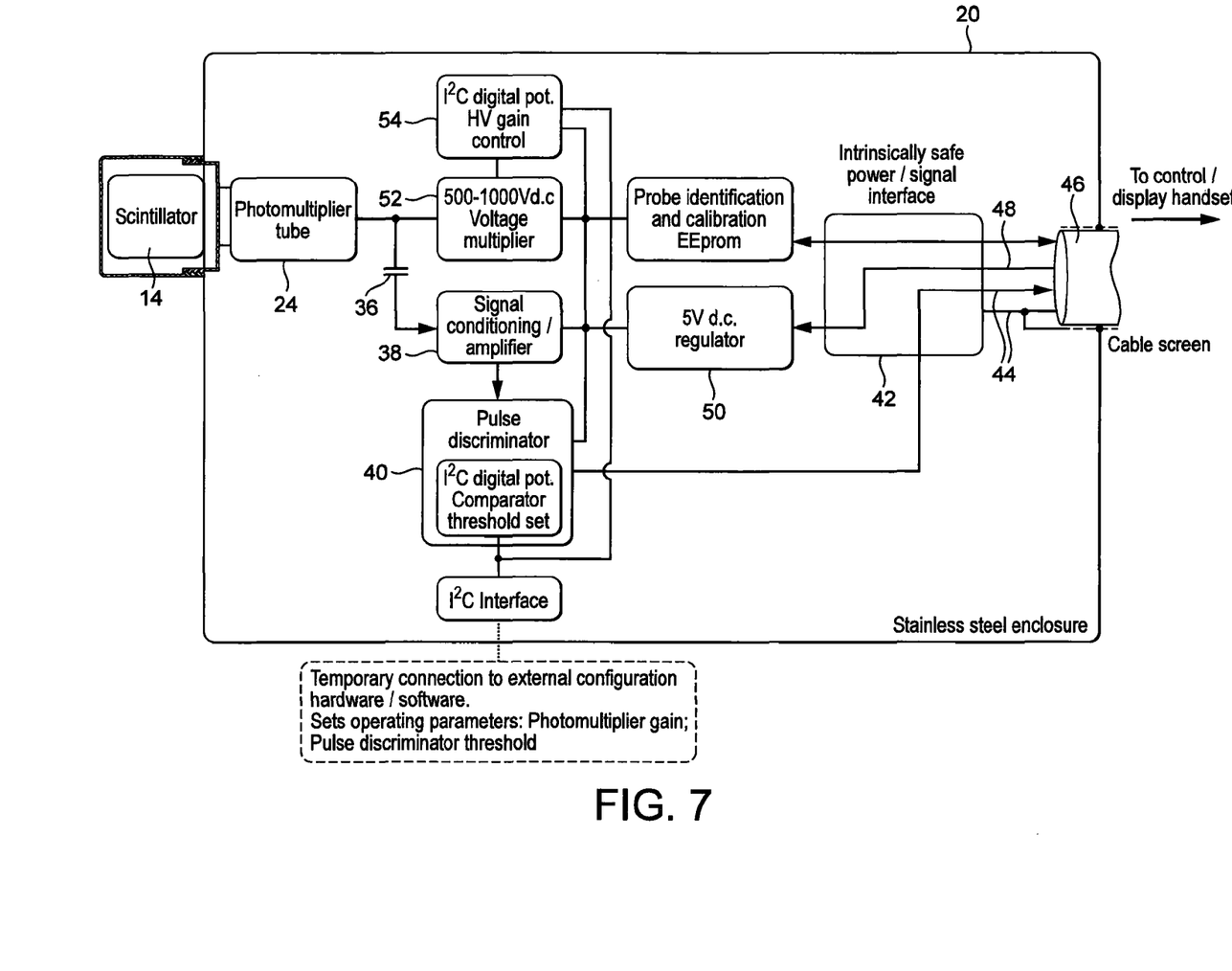
FIG. 7 is a schematic view of the apparatus of FIG. 1 showing control electronics.

As shown in greater detail in FIG. 7, photomultiplier tube 24 has high voltage output terminals 34 (FIG. 2) connected via a capacitor 36 to a signal conditioning amplifier 38 so that the high voltage photomultiplier terminals are isolated from the low voltage amplifier 38. The amplifier 38 provides an output pulse dependent on the intensity of visible light received by the photomultiplier tube 24 to a pulse discriminator 40 which is then provided to a low voltage power/signal interface 42 connected to output terminals 44 in output connector 46 located at the end of the housing 20 remote from the glass window 26. The connector 46 also has power supply terminal 48 providing 9V DC power via the power/signal interface 42 to a probe supply printed circuit board having a 5V DC regulator 50, which supplies an output voltage to a 500-1000V DC voltage multiplier 52 such as a Cockcroft Walton voltage multiplier, which will be familiar to persons skilled in the art, for supplying a high voltage supply to the photomultiplier tube 24, and a digital potentiometer high voltage gain control 54 for setting the output voltage of the voltage multiplier 52. In this way, the only electrical connections to the exterior of the housing 20 are low voltage connections, as a result of which the photomultiplier apparatus 2 can be made intrinsically safe for use in hazardous environments. When the processing electronics shown in FIG. 7 is located in the housing 20, the housing 20 is filled with light absorbing silicone casting material 56, similar to the material used to form the optical coupling 28, but generally opaque to light in the wavelength range emitted by the crystal 14, for minimising the amount of stray light reaching the photomultiplier tube 24. This improves the signal to noise ratio of the photomultiplier tube 24. The silicone casting material 56 encapsulates those parts of the photomultiplier tube 24 not encapsulated by the optical coupling 28, and forms an airtight seal between the housing and the window 26, so that in the event of breaking of the window 26, the atmosphere surrounding the housing is prevented from coming into contact with high voltage terminals of the photomultiplier tube 24.

It will be appreciated by persons skilled in the art that the above embodiment has been described by way of example only and not in any limitative sense, and that various alterations and modifications are possible without departure from the scope of the invention as defined by the appended claims.

The invention claimed is:

1. A photomultiplier apparatus comprising:
    a. a first housing;
    b. window means mounted to the first housing, the window means being at least partially transparent to electromagnetic radiation of a first wavelength range;
    c. photomultiplier means provided in the first housing for receiving electromagnetic radiation of said first wavelength range passing through said window means and generating an electrical output signal dependent on the intensity of said electromagnetic radiation;
    d. sealing means for isolating electrical terminals of said photomultiplier means from said window means; and
    e. resiliently deformable optical coupling means located between said window means and said photomultiplier means, for allowing at least some electromagnetic radiation of said first wavelength range passing through said window means to enter said photomultiplier means, wherein said resiliently deformable optical coupling means extends along a part of a sidewall of said photomultiplier means and encapsulates an end of the photomultiplier means facing said window means, and
    wherein said sealing means comprises an electrically insulating material which encapsulates at least some of the electrical terminals of the photomultiplier apparatus and which at least partially overlaps said optical coupling means so that said photomultiplier means is completely encapsulated by said sealing means and said optical coupling means.

2. An apparatus according to claim 1, wherein the optical coupling means comprises at least one mouldable material.

3. An apparatus according to claim 1, wherein said sealing means at least partly encapsulates said photomultiplier means.

4. An apparatus according to claim 1, wherein said sealing means is adapted to resist transmission of electromagnetic radiation in at least part of said first wavelength range.

5. An apparatus according to claim 1, wherein said sealing means comprises at least one mouldable material.

6. An apparatus according to claim 2, wherein at least one said mouldable material comprises a silicone material.

7. An apparatus according to claim 1, wherein the first housing includes a first material having smaller transmissibility to electromagnetic radiation of said first wavelength range than said window means.

8. A radiation detection apparatus comprising:
    a photomultiplier apparatus according to claim 1; and
    scintillator means for converting ionising radiation into electromagnetic radiation of said first wavelength range, wherein the scintillator means is optically coupled to the window means of said photomultiplier apparatus.

9. An apparatus according to claim 8, wherein the scintillator means comprises a second housing comprising a second material having greater transmissibility than said first material to the ionizing radiation.

10. An apparatus according to claim 8, wherein the scintillator means or said second housing includes means for mechanically coupling the scintillator means to the first housing such that the scintillator means is optically coupled to the window means of said photomultiplier apparatus.

11. An apparatus according to claim 8, wherein the mechanical coupling means is releasable such that the scintillator means and the photomultiplier means may be coupled together and decoupled.

12. An apparatus according to claim 11, wherein said mechanical coupling means comprises co-operatively threaded portions provided on the second housing and the first housing, a bayonet-type coupling between the first and second housings or an arrangement of fixing points which are coupled by means of screws, bolts or clips.

13. An apparatus according to claim 8, wherein the photomultiplier apparatus is intrinsically safe in the absence of the scintillator means.

14. A method of manufacturing a photomultiplier apparatus, the method comprising the steps of:
    a) forming an assembly comprising optical coupling means located between photomultiplier means and window means, wherein the optical coupling means is resiliently deformable, extends along a part of a sidewall of said photomultiplier means and encapsulates an end of the photomultiplier means facing said window means and the photomultiplier means is adapted to receive electromagnetic radiation of a first wavelength range passing through said window means thereby generating an electrical output signal dependent on the intensity of said electromagnetic radiation;

b) mounting the assembly within a housing; and c) providing sealing means for isolating electrical terminals of the photomultiplier means from the window means, wherein said sealing means comprises an electrically insulating material which encapsulates at least some of the electrical terminals of the photomultiplier apparatus and which at least partially overlaps said optical coupling means so that said photomultiplier means is completely encapsulated by said sealing means and said optical coupling means.

15. A method according to claim 14, wherein the step of forming said assembly comprises locating said photomultiplier means and said window means in position relative to each other and moulding said optical coupling means there between.

16. A method according to claim 14, wherein the step of providing said sealing means comprises at least partially filing the housing with at least one mouldable material.

17. An apparatus according to claim 2, wherein said sealing means at least partly encapsulates said photomultiplier means.

18. An apparatus according to claim 2, wherein said sealing means is adapted to resist transmission of electromagnetic radiation in at least part of said first wavelength range.

19. An apparatus according to claim 3, wherein said sealing means is adapted to resist transmission of electromagnetic radiation in at least part of said first wavelength range.

20. An apparatus according to claim 2, wherein said sealing means comprises at least one mouldable material.

\* \* \* \* \*